United States Patent
Neff et al.

[15] 3,653,252
[45] *Apr. 4, 1972

[54] WEAR TESTING

[72] Inventors: Paul J. Neff; Jerald L. Bright, both of Chicago, Ill.

[73] Assignee: AMSTED Industries Incorporated, Chicago, Ill.

[ * ] Notice: The portion of the term of this patent subsequent to Apr. 4, 1987, has been disclaimed.

[22] Filed: Aug. 21, 1968

[21] Appl. No.: 754,352

[52] U.S. Cl. ................................................................73/7
[51] Int. Cl. .........................................................G01n 3/56
[58] Field of Search ...............................73/7; 51/317, 7, 17

[56] References Cited

FOREIGN PATENTS OR APPLICATIONS 380,345  9/1923   Germany......................................73/7

Primary Examiner—Louis R. Prince
Assistant Examiner—Daniel M. Yasich
Attorney—Walter L. Schlegel, Jr.

[57] ABSTRACT

An elongated specimen bar of known weight is submerged in a mass of separate, irregular, abrasive lumps confined against rotation as a mass in a chamber, and then said bar is rotated on an axis angularly related to its longitudinal axis for a predetermined period of time. The bar is then removed from the chamber and is weighed to determine the amount of material which has been removed therefrom and/or the lumps are measured as by screening to determine the amount of crushing which has occurred in the lumps.

1 Claim, 5 Drawing Figures

PATENTED APR 4 1972          3,653,252

Inventor:
Paul J. Neff
Jerold L. Bright
By Walter S. Schlegel, Jr. Atty.

WEAR TESTING

This invention relates to testing and more particularly to the testing of a specimen bar of metal or other material to determine its resistance to a gouging action by irregular lumps of an abrasive such as commercial silicon carbide or any similar material which is very hard and brittle.

A primary object of the invention is to confine an elongated test bar of known weight in a mass of such lumps and rotate the bar on an axis angularly related to its longitudinal axis while confining the mass against rotation in a container in such a manner that the lumps interlock with each other because of their irregularity. After a predetermined period of time the bar is removed from the mass and is weighed to determine the amount of material which has been gouged therefrom.

It is also possible to test different batches of lumps with identical test bars. After each test period the batch may be screened to ascertain the amount of crushing which has been done by the bar thereby affording a comparison between the various batches.

The foregoing and other objects and advantages of the invention will become apparent from a consideration of the following specification and the accompanying drawings, wherein.

Figure 1:
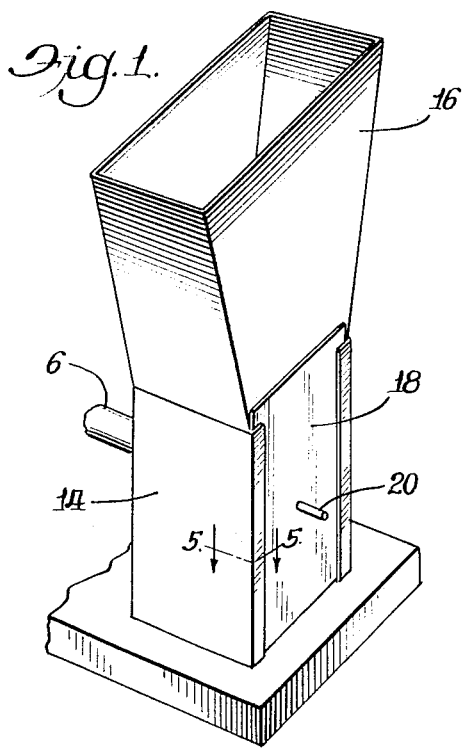
FIG. 1 is a perspective view of an apparatus by which the testing may be performed.
Figure 3:
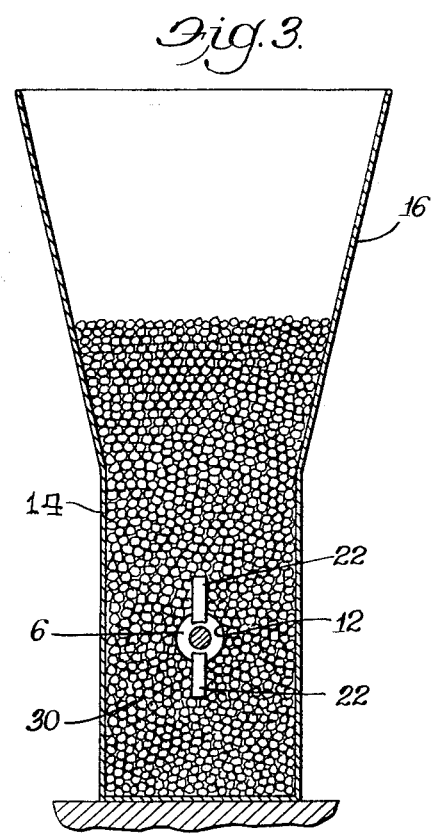
FIG. 3 is another vertical sectional view taken in a plane indicated by line 3—3 of FIG. 2.
Figure 2:
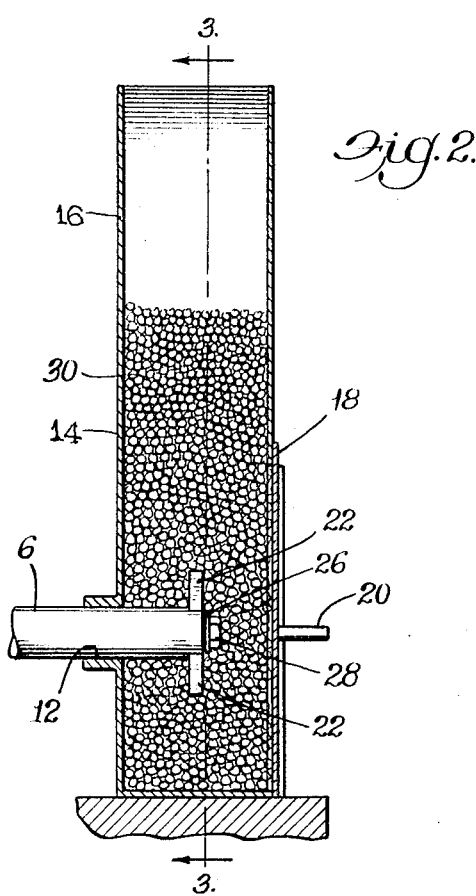
FIG. 2 is a vertical sectional view through the apparatus, with the rotor shaft and the specimen bar shown in elevational view.
Figure 4:
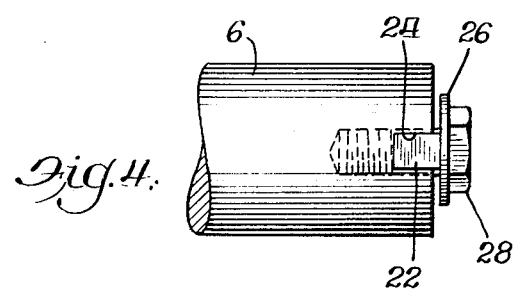
FIG. 4 is a fragmentary top plan view of the rotor shaft shown in FIGS. 2 and 3.
Figure 5:
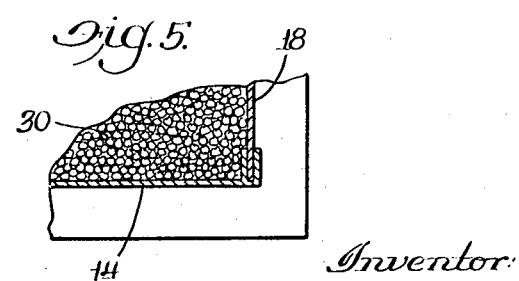
FIG. 5—5 is a fragmentary sectional view on line 5—5 of FIG. 1.

In each of said views certain details may be omitted for the sake of clarity where more clearly seen in other views.

Describing the apparatus in detail, a rotor shaft 6 is rotated, as by an electric motor and a gear reducer (not shown).

The shaft 6 extends into a complementary sealed opening 12 of a container or chamber 14 preferably comprising a hopper section 16. The container 14 also comprises a door 18 which may be opened as by handle 20.

As illustrated, two test specimen bars 22 are mounted in complementary notches 24 in the inner end of the shaft 6 by a washer 26 and a cap screw 28.

The container 14 is then filled with irregular abrasive lumps 30 to a height at which the irregularities of the lumps interlock them with each other so that the lumps are are not pushed downwardly as the shaft rotates. The shape of the container prevents the lumps 30 from rotating as a mass.

If desired the container 14 may be provided with a top lid for use under conditions where it is not desired to pile the abrasive lumps sufficiently high to create an inherent interlock therebetween without such a lid. However, the illustrated embodiment is preferred wherein the abrasive particles are piled high enough to create an inherent interlock therebetween without the necessity for a lid inasmuch as such an arrangement accommodates piling of the lumps high enough to compensate for settling of the abrasive lumps due to crushing thereof prior to termination of a test cycle.

According to actual practice of the invention, a pair of specimen bars 22 are rotated in the mass of abrasive lumps 30 for precisely one-half hour determined by an automatic timer (not shown) attached to the motor for de-energizing the motor after one-half hour. The abrasive lumps are then dumped from the machine by opening door 18. Then the container 14 is refilled, and the specimen bars 22 are then rotated for exactly another one-half hour. The abrasive lumps are again dumped from the machine. The test bars 22 are then removed from the rotor shaft 6 and are carefully weighed to determine the precise amount of material which has been removed from the specimen bars 22. This amount is commonly expressed in terms of grams per hour.

The test is repeated with specimen bars 22 composed of materials having various chemical and physical properties to afford a comparison of the resistance of various test bars 22 to the gouging type of abrasion characteristic of the test heretofore described, as distinguished from prior art tests wherein the wear of a test specimen is caused by simple abrasion.

It is noted that a rotation counter (not shown) should preferably be associated with the drive shaft 6 so that the operator can be assured that the shaft was rotated at a given R.P.M. during each period in which the specimens 22 are rotated within the mass of abrasive lumps 30. Such a rotation counter is not per se part of the invention and is not illustrated inasmuch as such devices are well known in the prior art.

As heretofore noted, the test procedure may also be performed to crush different batches of lumps with identical test bars to afford a comparison between the various batches.

What is claimed is:

1. A method of testing comprising mounting an elongated test bar in a stationary chamber for rotation on a substantially horizontal axis substantially normal to the longitudinal axis of the bar, then filling the chamber with a mass of irregularly shaped lumps of abrasive so confined in the chamber and so mutually interlocked by their irregular shape that the bar when rotated cannot push the lumps downwardly without crushing them, then rotating the bar for a predetermined period of time by means of a power source capable of crushing said lumps, thereby gouging said bar, then removing the bar from said chamber, and then measuring the amount of bar material which has been removed from said bar.

* * * * *